United States Patent
Yu et al.

(10) Patent No.: US 7,479,330 B2
(45) Date of Patent: *Jan. 20, 2009

(54) ANTHRACENE DERIVATIVES FOR ORGANIC ELECTROLUMINESCENT DEVICE

(75) Inventors: Chen-Ping Yu, Jhubei (TW); Chia-Liang Tai, Hsinchu (TW)

(73) Assignee: AU Optronics Corporation (TW)

( * ) Notice: Subject to any disclaimer, the term of this patent is extended or adjusted under 35 U.S.C. 154(b) by 694 days.

This patent is subject to a terminal disclaimer.

(21) Appl. No.: 11/138,707

(22) Filed: May 26, 2005

(65) Prior Publication Data

US 2006/0269783 A1    Nov. 30, 2006

(51) Int. Cl.
*H01L 51/50* (2006.01)

(52) U.S. Cl. .................. 428/690; 428/917; 313/504; 313/506

(58) Field of Classification Search .................. 313/504, 313/506
See application file for complete search history.

(56) References Cited

U.S. PATENT DOCUMENTS

| | | | | |
|---|---|---|---|---|
| 5,358,788 | A | 10/1994 | Kawamura et al. | 428/446 |
| 5,972,247 | A | 10/1999 | Shi et al. | 252/583 |
| 6,023,073 | A * | 2/2000 | Strite | 257/40 |
| 6,713,192 | B2 | 3/2004 | Fukuoka et al. | 428/690 |
| 7,064,481 | B2 | 6/2006 | Ko | 313/504 |
| 7,244,518 | B2 * | 7/2007 | Yu et al. | 428/690 |
| 7,244,528 | B2 | 7/2007 | Saruwatari | |
| 2003/0068524 | A1 * | 4/2003 | Hatwar | 428/690 |
| 2003/0087126 | A1 * | 5/2003 | Ishida et al. | 428/690 |
| 2003/0215667 | A1 | 11/2003 | Xie | 428/690 |
| 2004/0058193 | A1 | 3/2004 | Hatwar | 428/690 |
| 2004/0137270 | A1 | 7/2004 | Seo et al. | |
| 2006/0008674 | A1 | 1/2006 | Yu | 428/690 |
| 2006/0043859 | A1 | 3/2006 | Fukuoka et al. | |

FOREIGN PATENT DOCUMENTS

| | | |
|---|---|---|
| CN | 1587268 | 3/2005 |
| JP | 2002154993 | 5/2002 |
| JP | 2003229273 | 8/2003 |
| JP | 2004-067528 | 3/2004 |
| JP | 2004204238 | 7/2004 |
| JP | 2004221045 | 8/2004 |
| JP | 2006028175 | 2/2006 |
| TW | 1224943 | 12/2004 |
| TW | 200515834 | 5/2005 |
| WO | WO 2004/057926 A1 | 7/2004 |
| WO | WO2004/078872 A2 | 9/2004 |

OTHER PUBLICATIONS

Derwent abstract for CN 1587268 published Mar. 2005.*

* cited by examiner

*Primary Examiner*—Dawn Garrett
(74) *Attorney, Agent, or Firm*—Ware, Fressola, Van Der Sluys & Adolphson, LLP; Bradford Green

(57) ABSTRACT

In an OLED having an electron transport layer and a light emitting layer, at least one of these layers contains an anthracene derivative, wherein at least one of the substituents on the anthracene compound has a tetra-substitution center of either C—$SP^3$ or Si. The anthracene derivative can be used as dopant or host material in the light-emitting layer.

20 Claims, 2 Drawing Sheets

ANTHRACENE DERIVATIVES FOR ORGANIC ELECTROLUMINESCENT DEVICE

FIELD OF THE INVENTION

The present invention relates generally to organic light-emitting devices and, more particularly, to organic light-emitting device using an anthracene compound as host material or dopant in one of the layers in the organic light-emitting device.

BACKGROUND OF THE INVENTION

Organic light-emitting diodes OLEDs are known in the art. In blue electroluminescent devices, anthracene derivatives have been used as the organic electroluminescent or light-emitting media. For example, Xie (U.S. Patent Publication No. 2003/0215667 A1) discloses an OLED wherein coumarin derivatives are used as color dopants in the anthracene derivatives. Fukuoka et al. (U.S. Pat. No. 6,713,192 B2) discloses an OLED wherein at least one of the compounds in the light emitting medium is selected from anthracene derivatives with monovalent condensed aromatic ring groups as substituents. Kawamura et al. (U.S. Pat. No. 5,358,788) discloses an OLED containing a silanamine compound. Shi et al. (U.S. Pat. No. 5,972,247) discloses an OLED wherein the organic electroluminescent layer contains one or more 9,10-bis(3'5'-diaryl)phenyl anthracene derivatives.

It is advantageous and desirable to provide a different type of anthracene derivatives as an efficient host material for the organic electroluminescent layer.

SUMMARY OF THE INVENTION

The organic electroluminescent layer in an OLED, according to one embodiment of the present invention, comprises an anthracene derivative for use as dopant or host material in the light-emitting layer, wherein at least one of the substituents on the anthracene compound has a tetra-substitution center of either C—SP$^3$ or Si. The general formula for the anthracene derivatives for use in the electroluminescent layer in an OLED, according to the present invention, has the structure:

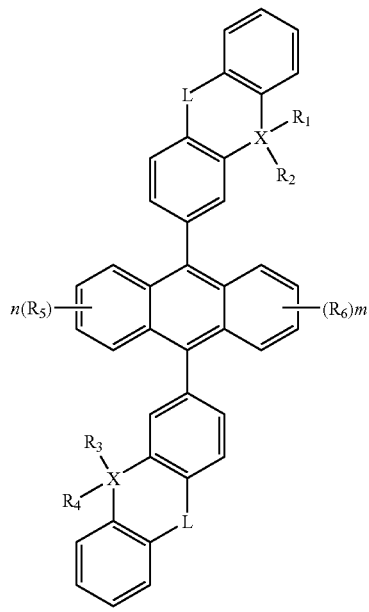

wherein $R_1$, $R_2$, $R_3$, $R_4$ are each individually selected from the group consisting of alkyl ($C_{1-12}$) and aryl ($C_{6-20}$);

$R_5$, $R_6$ are each selected from the group consisting of methyl and F;

X is selected from the group consisting of C and Si;

L is the number of bonds, selected from 0 and 1; and n, m are positive integers ranged from 0 to 4.

When the anthracene derivative is used as a host material in the light-emitting layer, the dopant is DSA, for example. The volume ratio between the host material and the dopant is 100:2.5, for example.

When the anthracene derivative is used as a dopant in the light-emitting layer, the host material in the light-emitting layer is ADN, for example. The volume ratio between the host material and the dopant is 100:2.5, for example.

The electron source is made of $Alq_3$, for example.

In another embodiment of the present invention, the anthracene derivative is used as a host material in the electron source of the organic light-emitting device. The dopant in the electron source is CsF, for example. The light-emitting layer is made of ADN as host material and DSA as dopant, for example.

DETAILED DESCRIPTION OF THE INVENTION

Figure 1:
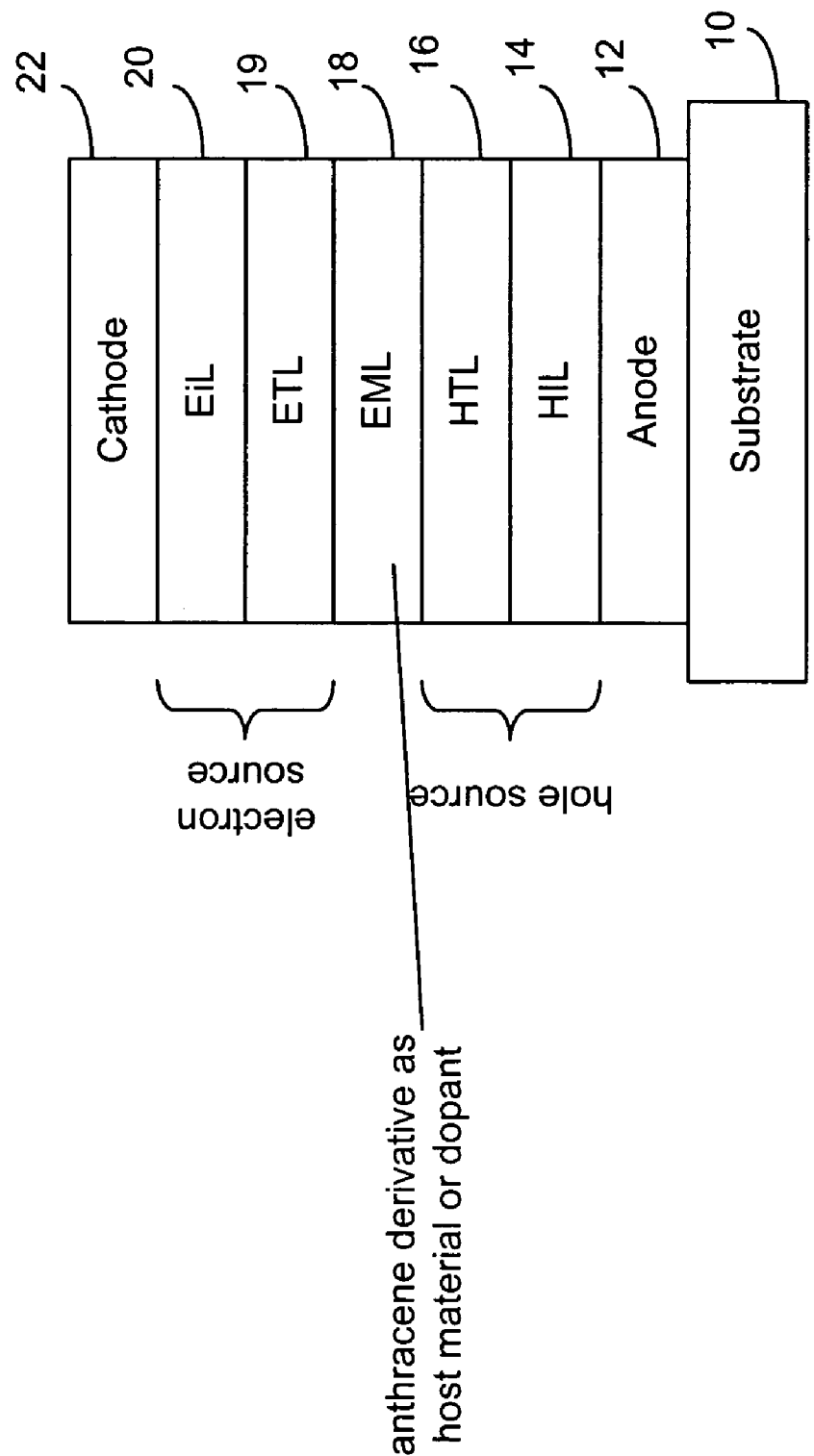
FIG. 1 is a schematic representation showing an exemplary embodiment of the OLED, according to the present invention.

FIG. 1 shows an exemplary layer structure of an organic light-emitting device (OLED), according to the present invention. As shown in FIG. 1, the OLED comprises an anode 12 disposed on a substrate 10, a cathode 22 and a plurality of layers disposed between the anode 12 and the cathode 22. The layers include at least an electron source layer, an electroluminescent layer and a hole source layer. For example, the electron source layer comprises an electron transport layer (ETL) 19, and the hole source layer comprises a hole injection layer (HIL) 12 and a hole transport layer (HTL) 14. ETL, HIL, HTL are known in the art. The electroluminescent layer 18 comprises a host material doped with an anthracene derivative or a combination of anthracene derivatives. It may be desirable to dispose an electron injection layer (EIL) 20, such as LiF, adjacent to the cathode, as shown in FIG. 1.

The electroluminescent layer in an OLED, according to the present invention, at least contain one of the anthracene derivatives as dopant or host material at least in one of the electron source layer and the light-emitting layer, the anthracene derivatives having the structure:

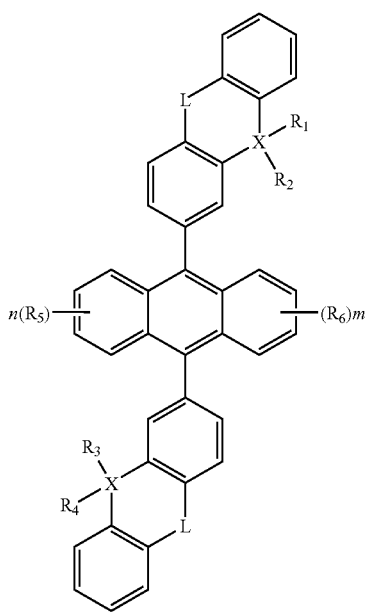

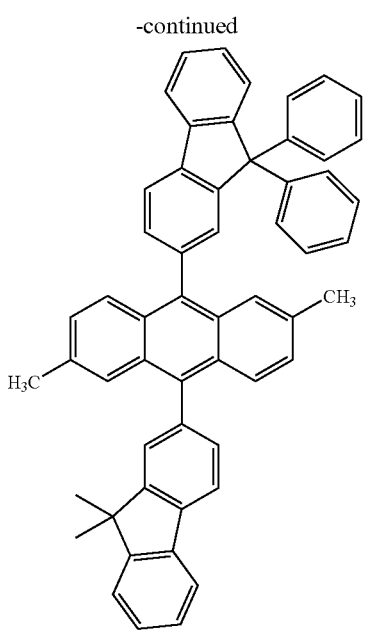

wherein $R_1$, $R_2$, $R_3$, $R_4$ are each individually selected from the group consisting of alkyl ($C_{1-12}$) and aryl ($C_{6-20}$);

$R_5$, $R_6$ are each selected from the group consisting of methyl and F;

X is selected from the group consisting of C and Si;

L is a number of bonds, selected from 0 and 1; and n, m are positive integers ranged from 0 to 4.

A number of examples of the anthracene derivatives for use in the OLED, according to the present invention, are shown below:

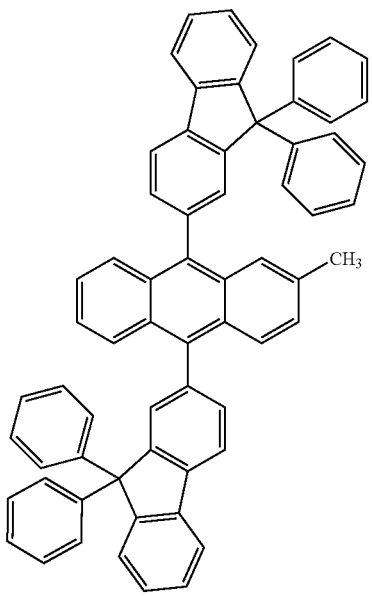

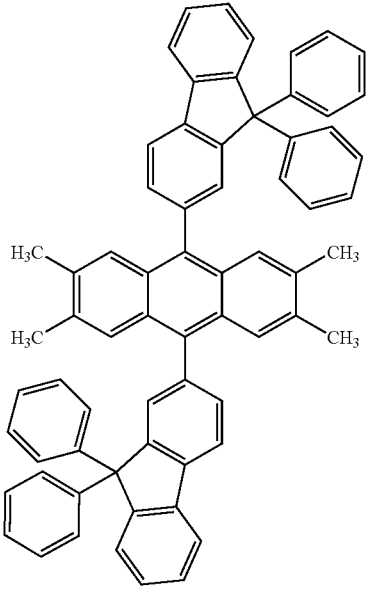

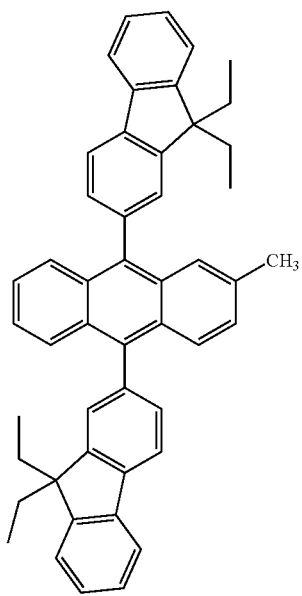
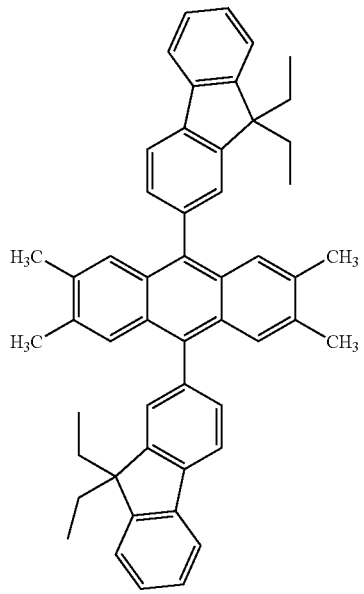
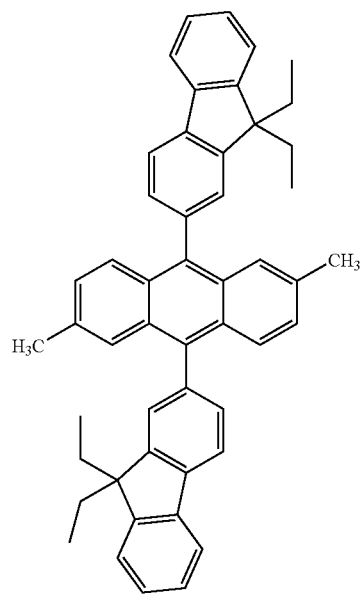
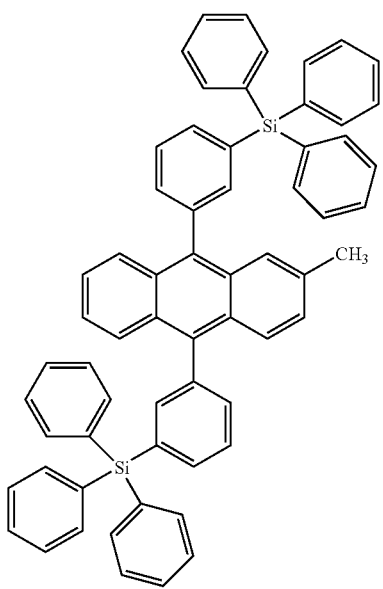

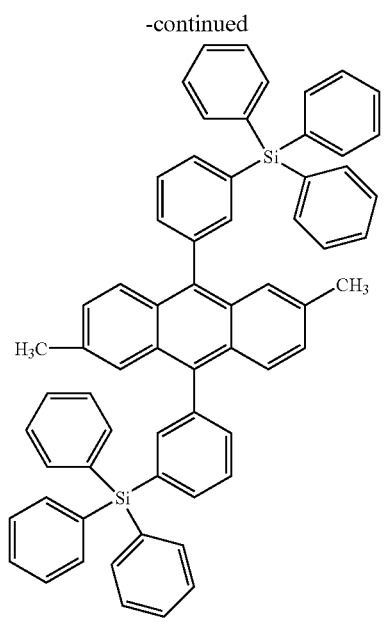
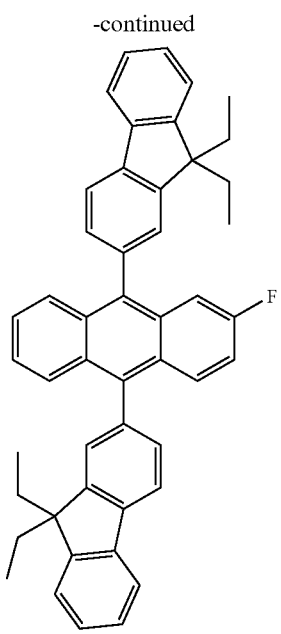
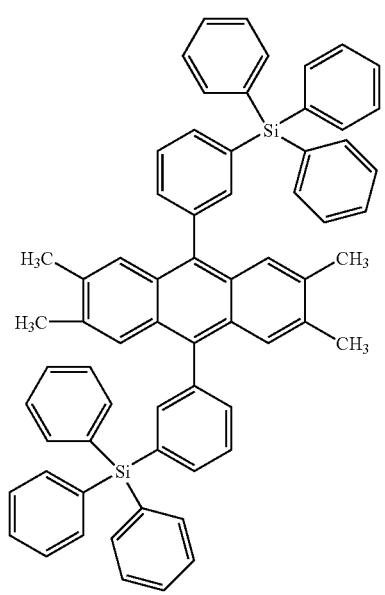
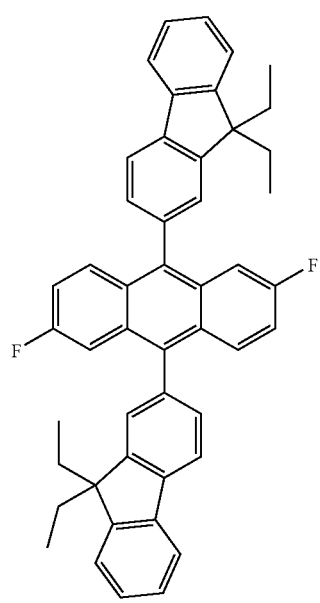

-continued
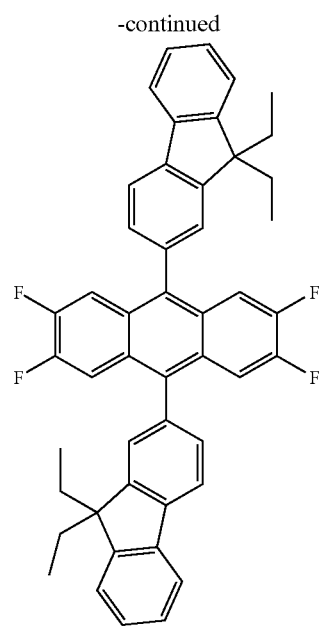
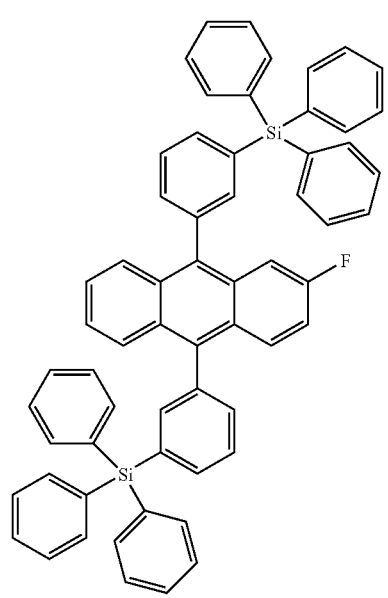
-continued
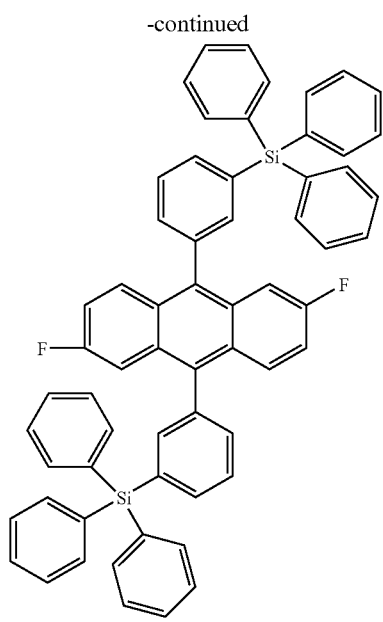
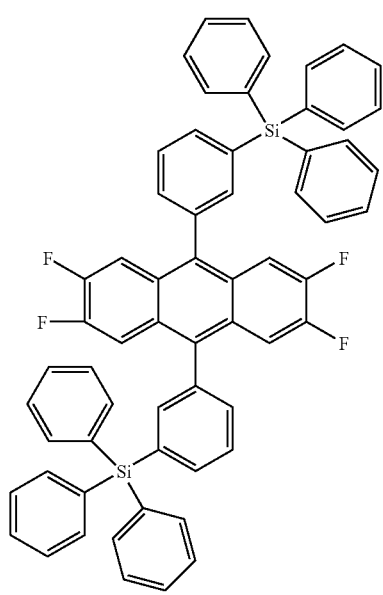

-continued

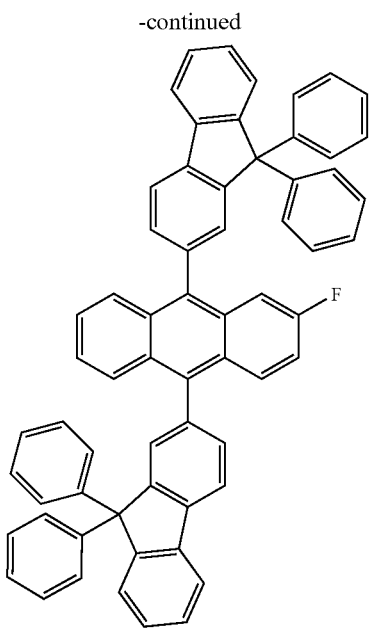

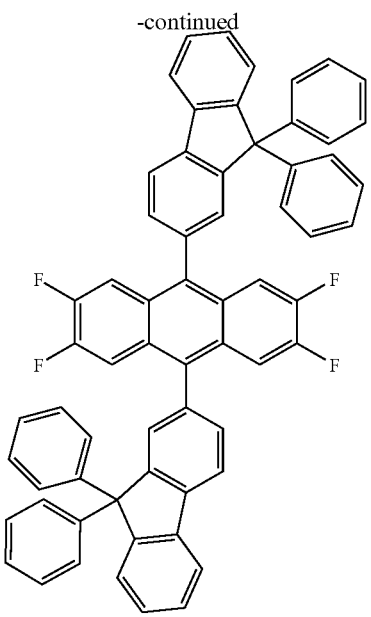

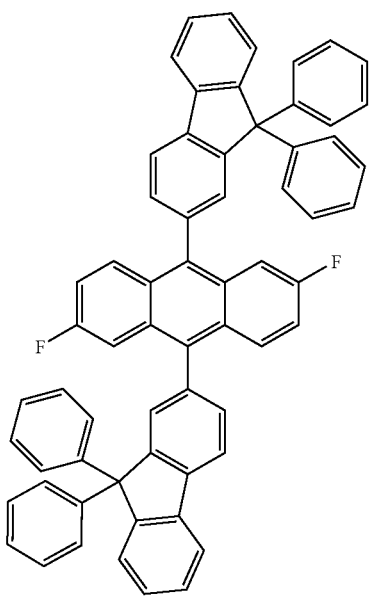

Although synthesis of the anthracene derivatives for use in the OLED, according to the present invention, is not part of the claimed invention, it would be useful to show some of the synthesizing processes as follows:

Synthesis of 2-fluoroanthraquinone

To a solution of 2-aminoanthraqunione (10 g, 45 mmol) in 96% $H_2SO_4$ (130 mL) at 0° C., $NaNO_2$ (0.38 g, 55 mmol) is added portion-wise. The mixed solution is stirred for 2 hours at room temperature, then poured into an aqueous solution (150 mL) of $NaBF_4$ (6.8 g, 62 mmol) at 0° C. The mixture is stirred for an additional 1 hour, the precipitate is filtered, washed with methanol, resulting a gray precipitate. The crude precipitate is heated to 200° C. to undergo a thermally decomposed process. Sublimation of the crude product yields 2-fluoroanthraquinone (4.2 g).

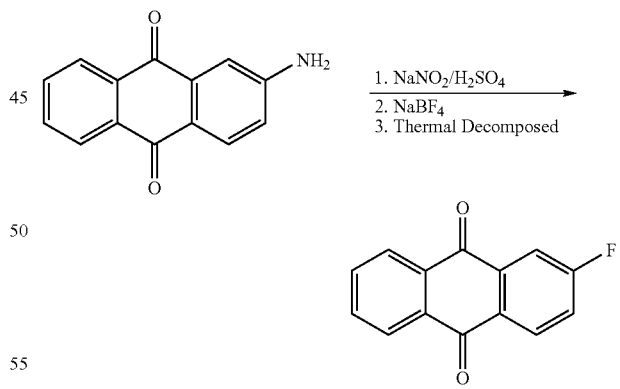

Synthesis of 2-Fluoro-9,10-di[2-(9,9-diethylfluorenyl)]anthracene

In a nitrogen atmosphere, 6 g (20.8 mmol) of 2-bromo-9,9-diethylfluorene, and 100 ml of tetrahydrofuran (THF) are added to a round-bottom flask. Next, 8.4 mL (20.8 mmol, 2.5M) of n-butyl lithium is added drop-wise slowly into the round-bottom flask at −78° C. After the mixture is mixed and allowed to react for 30 min, 2.25 g (10 mmol) 2-fluoroanthraquinone with 30 ml THF is added drop-wise slowly into the round-bottom flask at −78° C. After reacting at room temperature for 24 hours, the resulting mixture is subjected to extraction with a mixed solvent (ethyl acetate:H$_2$O), dried over anhydrous MgSO$_4$, filtered, and condensed, giving the residue. To this residue, add 4.8 g (40 mmol) of potassium iodide, 3.3 g (20 mmol) of sodium hypophosphite monohydrate, 50 ml of acetic acid in a reaction bottle and heated to reflux for 2 hours. After being cooled, white precipitation in the bottle is collected and purified by column chromatography, giving 4 g of a Compound B, as shown below:

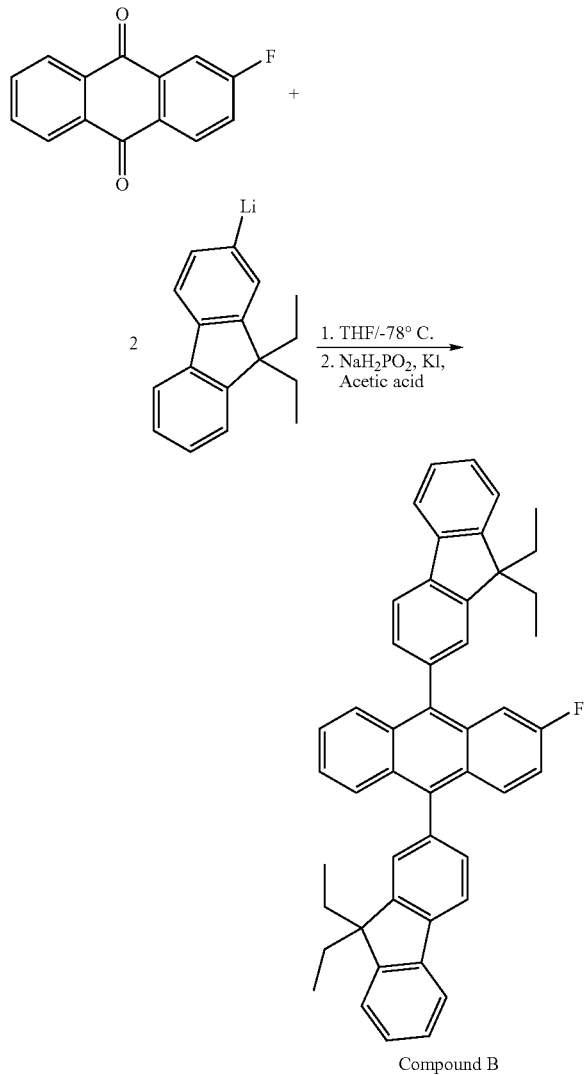

Compound B

Synthesis of 2-methyl-9,10-di[2-(9,9-diethylfluorenyl)]anthracene (Compound A)

Compound A is synthesized in accordance with the same procedure in synthesizing Compound B except that 2-fluoroanthraquinone is replaced with 2-methylanthraquinone.

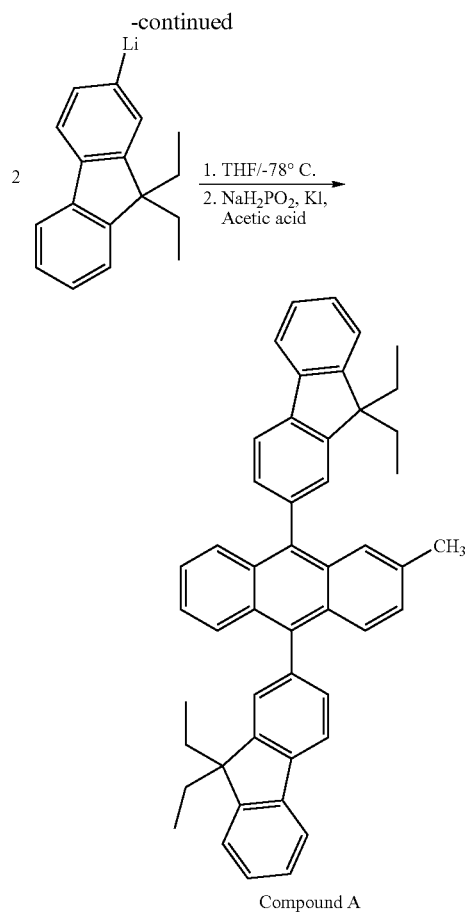

Compound A

Synthesis of 2-methyl-9,10-di(3-triphenylsilylphenyl)anthracene (Compound C)

In a nitrogen atmosphere, 5.7 g (24 mmol) of 1,3-dibromo benzene, and 100 ml of tetrahydrofuran (THF) are added to a round-bottom flask. Next, 9.6 ml (24 mmol, 2.5M) of n-butyl lithium is added drop-wise slowly into the round-bottom flask at −78° C. After the mixture is mixed and allowed to react for 30 min, 2.7 g (12 mmol) 2-methylanthraquninoe with 30 ml THF is added drop-wise slowly into the round-bottom flask at −78° C. After reacting at room temperature for 24 hours, the resulting mixture is subjected to extraction with a mixed solvent (ethyl acetate:H$_2$O), dried over anhydrous MgSO$_4$, filtered, and condensed, giving the residue. To this residue, add 4.7 g (29 mmol) of potassium iodide, 6.8 g (58 mmol) of sodium hypophosphite monohydrate, 50 ml of acetic acid to produce an intermediate product. The intermediate product is placed in a reaction bottle and heated to reflux for 2 hours. After being cooled, white precipitation in the bottle was collected and purified by column chromatography, giving 4.5 g of. 4.5 g (9 mmol) of intermediate A is then dissolved in 150 ml of anhydrous THF. Next, 7.2 ml (18 mmol, 2.5M) of n-butyl lithium is added drop-wise slowly into the solution. After the mixture is mixed and allowed to react for 30 min, 5.3 g (18 mmol) of triphenylsilyl chloride (dissolved with 20 ml THF) is added drop-wise slowly into the above solution at −78° C. After reacting at room temperature for 16 hours, the resulting mixture was filtered, washed with a mixture solvent (ethanol:hexane=1:1), and condensed, giving a crude product as a white solid which was purified by sublimation to obtain 2.0 g of Compound C.

Device Performance

Figure 2:
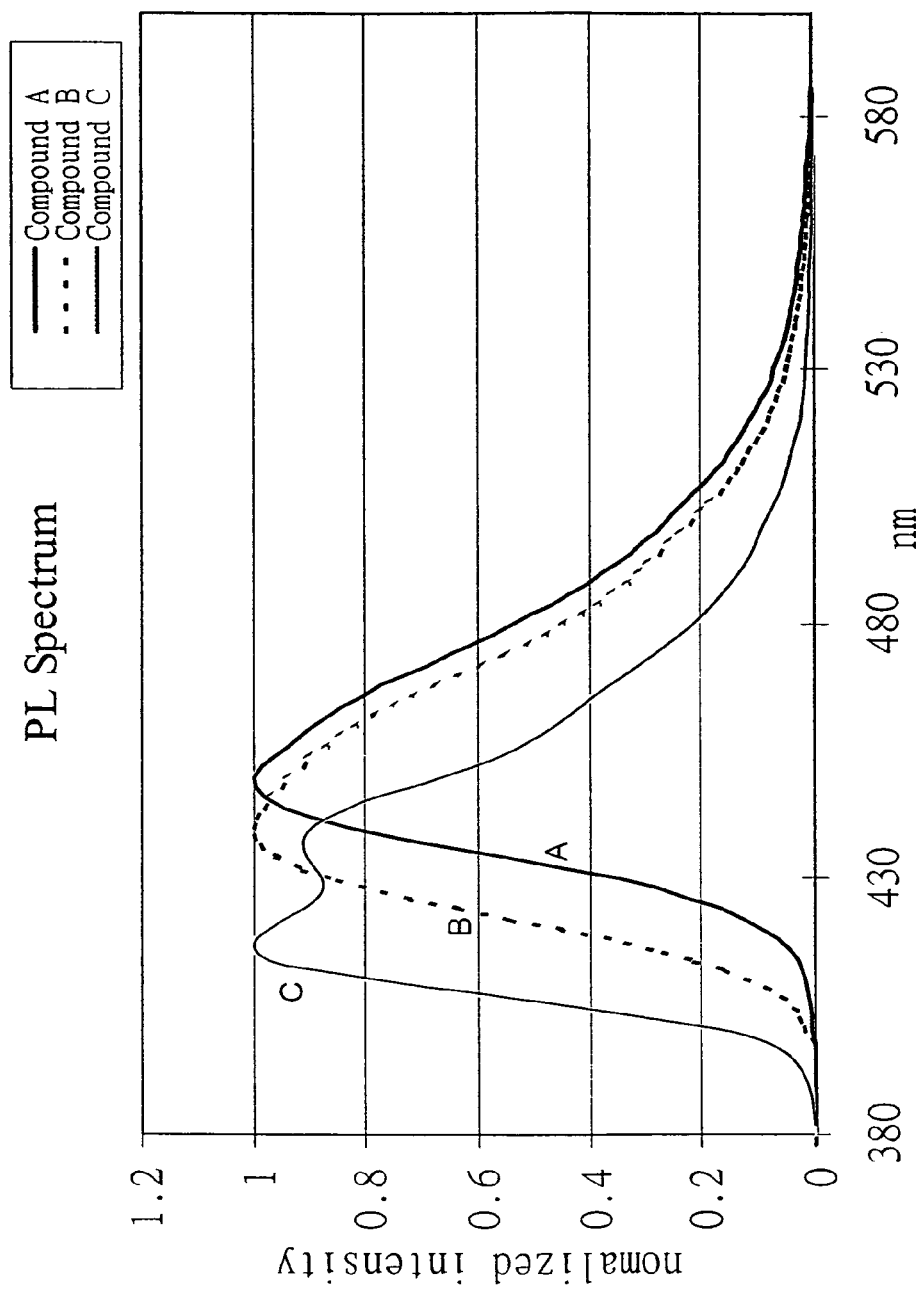
FIG. 2 is a plot showing the emission spectrum of some of the anthracene derivatives to be used in the OLED, according to the present invention.

Seven exemplary devices using three different compounds have been made. In particular, Compound A is used in Device Example 1, Device Example 3 and Device Example 6; Compound B is used in Device Example 2, Device Example 4 and Device Example 7; and Compound C is used in Device Example 5. The emission spectra of Compound A, Compound B and Compound C are shown in FIG. 2.

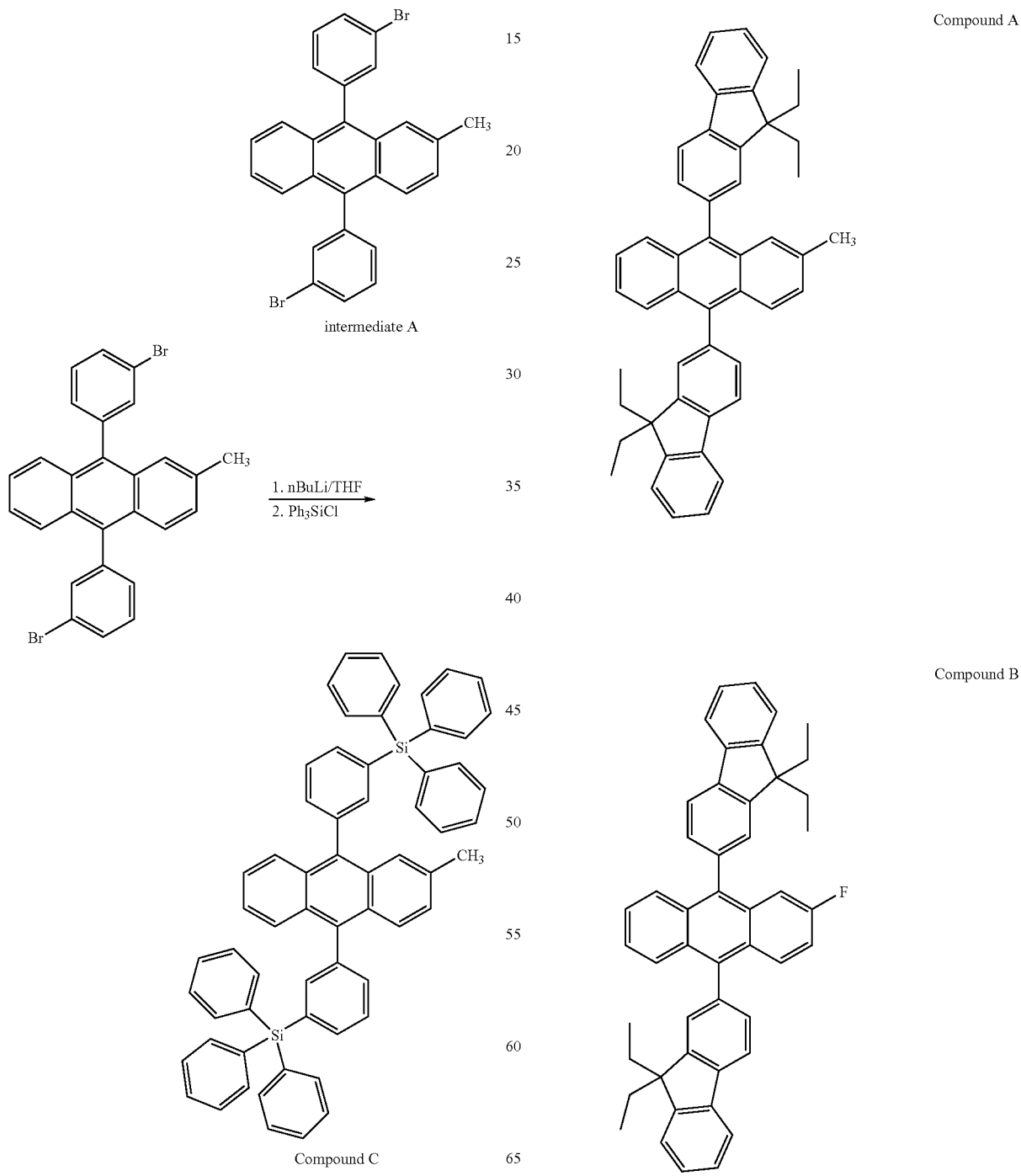

-continued

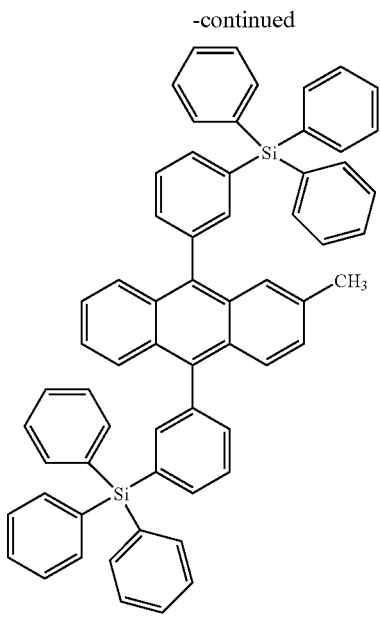

Compound C

DEVICE EXAMPLE 1

Anode: indium tin oxide (ITO) of about 75 nm on a glass substrate;
Hole injection layer (60 nm): of 2T-NATA (4,4',4"-tri(N-(2-naphthyl)-N-aniline)-triphenyl amine);
Hole transport layer (30 nm): NPB (N,N'-di-1-naphthyl-N,N'-diphenyl-1,1'-biphenyl-1,1'-biphenyl-4,4'-diamine);
Light-emitting layer (30 nm): host material is ADN and luminescent dopant is Compound A, with a volume ratio between ADN and Compound A being 100:2.5;
Electron transport layer (30 nm): Alq$_3$ (tris(8-hydroxyquinoline)aluminum);
Buffer layer (10 Å): lithium fluoride; and
Cathode (100 nm): aluminum.
The structure of ADN is shown below:

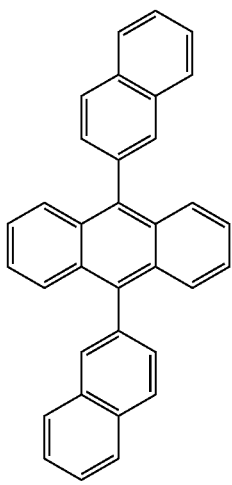

ADN

The measured properties of Device Example 1 are shown in Table I.

DEVICE EXAMPLE 2

Anode: indium tin oxide (ITO) of about 75 nm on a glass substrate;
Hole injection layer (60 nm): of 2T-NATA (4,4',4"-tri(N-(2-naphthyl)-N-aniline)-triphenyl amine);
Hole transport layer (30 nm): NPB (N,N'-di-1-naphthyl-N,N'-diphenyl-1,1'-biphenyl-1,1'-biphenyl-4,4'-diamine);
Light-emitting layer (30 nm): host material is ADN and luminescent dopant is Compound B, with a volume ratio between ADN and Compound B being 100:2.5;
Electron transport layer (30 nm): Alq$_3$ (tris(8-hydroxyquinoline)aluminum);
Buffer layer (10 Å): lithium fluoride; and
Cathode (100 nm): aluminum.
The measured properties of Device Example 2 are shown in Table 1.

TABLE I

Device Characteristics of Examples 1 and 2

| Example | Operation Voltage (V) | Brightness (cd/m$^2$) | CIE chromaticity coordinates (X axis) | CIE chromaticity coordinates (Y axis) | Efficiency (cd/A) |
|---|---|---|---|---|---|
| 1 | 7.0 | 1000 | 0.17 | 0.16 | 2.1 |
| 2 | 7.1 | 1000 | 0.17 | 0.16 | 2.2 |

DEVICE EXAMPLE 3

Anode: indium tin oxide (ITO) of about 75 nm on a glass substrate;
Hole injection layer (60 nm): of 2T-NATA (4,4',4"-tri(N-(2-naphthyl)-N-aniline)-triphenyl amine);
Hole transport layer (30 nm): NPB (N,N'-di-1-naphthyl-N,N'-diphenyl-1,1'-biphenyl-1,1'-biphenyl-4,4'-diamine);
Light-emitting layer (30 nm): host material is Compound A and luminescent dopant is DSA, with a volume ratio between Compound A and DSA being 100:2.5;
Electron transport layer (30 nm): Alq$_3$ (tris(8-hydroxyquinoline)aluminum);
Buffer layer (10 Å): lithium fluoride; and
Cathode (100 nm): aluminum.
The structure of DSA is shown below:

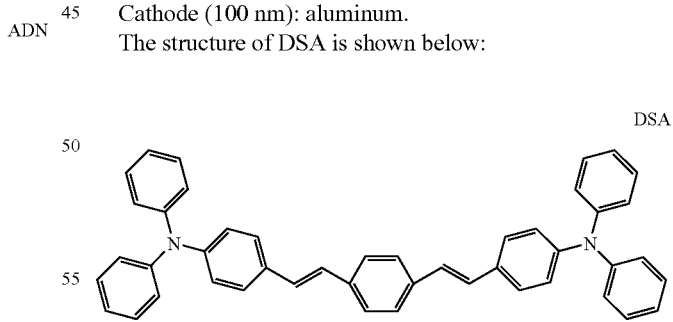

DSA

DEVICE EXAMPLE 4

Anode: indium tin oxide (ITO) of about 75 nm on a glass substrate;
Hole injection layer (60 nm): of 2T-NATA (4,4',4"-tri(N-(2-naphthyl)-N-aniline)-triphenyl amine);
Hole transport layer (30 nm): NPB (N,N'-di-1-naphthyl-N,N'-diphenyl-1,1'-biphenyl-1,1 '-biphenyl-4,4'-diamine);

Light-emitting layer (30 nm): host material is Compound B and luminescent dopant is DSA, with a volume ratio between Compound B and DSA being 100:2.5;

Electron transport layer (30 nm): Alq$_3$ (tris(8-hydroxyquinoline)aluminum);

Buffer layer (10 Å): lithium fluoride; and

Cathode (100 nm): aluminum.

The measure device properties of Device Examples 3 and 4 are shown in Table II.

TABLE II

Device Characteristics of Examples

| Example | Operation Voltage (V) | Brightness (cd/m$^2$) | CIE chromaticity coordinates (X axis) | CIE chromaticity coordinates (Y axis) | Efficiency (cd/A) |
| --- | --- | --- | --- | --- | --- |
| 3 | 7.7 | 1000 | 0.15 | 0.15 | 3.1 |
| 4 | 7.6 | 1000 | 0.15 | 0.21 | 4.5 |

DEVICE EXAMPLE 5

Anode: indium tin oxide (ITO) of about 75 nm on a glass substrate;

Hole injection layer (60 nm): of 2T-NATA (4,4',4''-tri(N-(2-naphthyl)-N-aniline)-triphenyl amine);

Hole transport layer (30 nm): NPB (N,N'-di-1-naphthyl-N,N'-diphenyl-1,1'-biphenyl-1,1'-biphenyl-4,4'-diamine);

Light-emitting layer (30 nm): host material is Compound C and luminescent dopant is DSA, with a volume ratio between Compound C and DSA being 100:2.5;

Electron transport layer (30 nm): Alq$_3$ (tris(8-hydroxyquinoline)aluminum);

Buffer layer (10 Å): lithium fluoride; and

Cathode (100 nm): aluminum.

The measured device properties of Device Example 5 are shown in Table III.

TABLE III

Device Characteristics of Examples

| Example | Operation Voltage (V) | Brightness (cd/m$^2$) | CIE chromaticity coordinates (X axis) | CIE chromaticity coordinates (Y axis) | Efficiency (cd/A) |
| --- | --- | --- | --- | --- | --- |
| 5 | 7.8 | 1000 | 0.15 | 0.19 | 3.5 |

DEVICE EXAMPLE 6

Anode: indium tin oxide (ITO) of about 75 nm on a glass substrate;

Hole injection layer (60 nm): of 2T-NATA (4,4',4''-tri(N-(2-naphthyl)-N-aniline)-triphenyl amine);

Hole transport layer (30 nm): NPB (N,N'-di-1-naphthyl-N,N'-diphenyl-1,1'-biphenyl-1,1'-biphenyl-4,4'-diamine);

Light-emitting layer (30 nm): host material is ADN and luminescent dopant is DSA, with a volume ratio between ADN and DSA being 100:2.5;

Electron transport layer (30 nm): host material is Compound A and luminescent dopant is CsF, with a volume ratio between Compound A and CsF being 100:20;

Buffer layer (10 Å): lithium fluoride; and

Cathode (100 nm): aluminum.

DEVICE EXAMPLE 7

Anode: indium tin oxide (ITO) of about 75 nm on a glass substrate;

Hole injection layer (60 nm): of 2T-NATA (4,4',4''-tri(N-(2-naphthyl)-N-aniline)-triphenyl amine);

Hole transport layer (30 nm): NPB (N,N'-di-1-naphthyl-N,N'-diphenyl-1,1'-biphenyl-1,1'-biphenyl-4,4'-diamine);

Light-emitting layer (30 nm): host material is ADN and luminescent dopant is DSA, with a volume ratio between ADN and DSA being 100:2.5;

Electron transport layer (30 nm): host material is Compound B and luminescent dopant is CsF, with a volume ratio between Compound B and CsF being 100:20;

Buffer layer (10 Å): lithium fluoride; and

Cathode (100 nm): aluminum.

The measured device properties of Device Examples 6 and 7 are shown in Table IV.

TABLE IV

Device Characteristics of Examples

| Example | Operation Voltage (V) | Brightness (cd/m$^2$) | CIE chromaticity coordinates (X axis) | CIE chromaticity coordinates (Y axis) | Efficiency (cd/A) |
| --- | --- | --- | --- | --- | --- |
| 6 | 5.1 | 1000 | 0.15 | 0.17 | 5.1 |
| 7 | 5.2 | 1000 | 0.15 | 0.15 | 5.6 |

In sum, the OLED according to the present invention uses an anthracene derivative as a host material or as a dopant in the light-emitting layer. Alternatively, the anthracene derivative is used as a host material in the electron transport layer. In order to compare the performance of the OLED according to the present invention, the device properties of a standard deep blue OLED are also measured.

When the anthracene derivative is used as a host material in the light-emitting layer, the dopant is DSA, for example. The volume ratio between the host material and the dopant is 100:2.5, for example.

When the anthracene derivative is used as a dopant in the light-emitting layer, the host material in the light-emitting layer is ADN, for example. The volume ratio between the host material and the dopant is 100:2.5, for example.

The electron source is made of Alq$_3$, for example.

When the anthracene derivative is used as a host material in the electron source of the organic light-emitting device, the dopant in the electron source is CsF, for example. The light-emitting layer is made of ADN as host material and DSA as dopant, for example.

In the OLED according to the present invention, at least one of the anthracene derivatives disclosed herein is used as a host material or a dopant. The anthracene derivatives can also be used in the electron source. It should be appreciated by one skilled in the art that an OLED in general comprises a cathode, a hole source, a light emitting layer, an electron source and an anode. The electron source comprises an electron transport layer and the hole source comprises a hole transport layer. However, the electron source may comprise an electron injection layer disposed between the electron transport layer and the cathode, and the hole source may comprise a hole injection source disposed between the hole transport layer and the anode. Additionally, one or more buffer layers can be disposed between the electron source and the cathode. For example, an electron injection layer made of LiF can be disposed adjacent to the cathode.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. An organic light-emitting device, comprising:
   a cathode;
   an anode; and
   a layer structure disposed between the cathode and anode, the layer structure comprising:
   a hole source adjacent to the anode; and
   a layer sub-structure disposed between the hole source and the cathode, the layer sub-structure comprising a first further layer and a second further layer, the first further layer comprising an electron source adjacent to the cathode; and the second further layer comprising a light emitting layer disposed between the electron source and the hole source, wherein at least one of the two further layers contains at least one of anthracene derivatives, the anthracene derivatives having a structure:

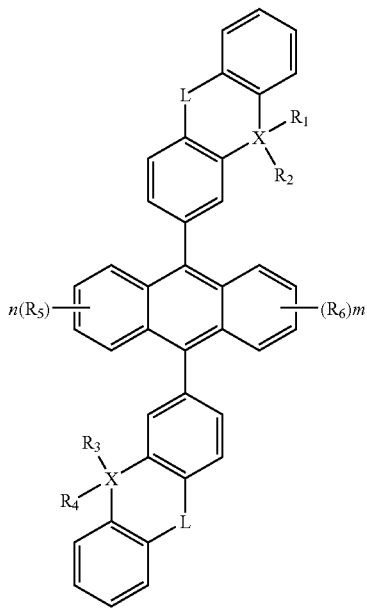

wherein
   $R_1$, $R_2$, $R_3$, $R_4$ are each individually selected from the group consisting of alkyl ($C_{1-12}$) and aryl ($C_{6-20}$);
   $R_5$, $R_6$ are each selected from the group consisting of methyl and F;
   X=Si;
   L is a number of bonds, equal to 1; and
   n, m are positive integers ranged from 0 to 4.

2. The organic light-emitting device of claim 1, wherein the hole source comprises a hole injection layer adjacent to the anode and a hole transport layer disposed between the hole injection layer and the light emitting layer.

3. The organic light-emitting device of claim 1, wherein the electron source comprises an electron transport layer.

4. The organic light-emitting device of claim 1, wherein the electron source comprises an electron injection layer adjacent to the cathode and an electron transport layer disposed between the electron injection layer and the light emitting layer.

5. The organic light-emitting device of claim 4, wherein the electron injection layer is made substantially of LiF.

6. The organic light-emitting device of claim 1, wherein $R_1=R_2$.

7. The organic light-emitting device of claim 1, wherein $R_3=R_4$.

8. The organic light-emitting device of claim 1, wherein $R_1=R_2=R_3=R_4$.

9. The organic light-emitting device of claim 1, wherein
   the light emitting layer contains an organic host material and said at least one of anthracene derivatives as a dopant in the host material.

10. The organic light-emitting device of claim 9, wherein the electron source layer is made substantially of Alq3, and the organic host material is made substantially of ADN, with ADN having the structure:

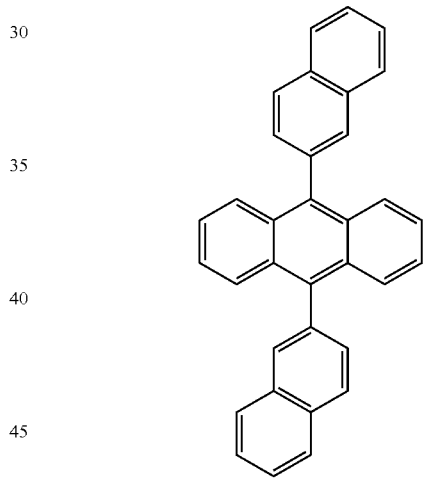

11. The organic light-emitting device of claim 1, wherein
    the light emitting layer contains a host material and an organic dopant, the host material made substantially of said at least one of anthracene derivatives.

12. The organic light-emitting device of claim 11, wherein the electron source is substantially made of $Alq_3$, and the dopant comprising DSA, with DSA having the structure:

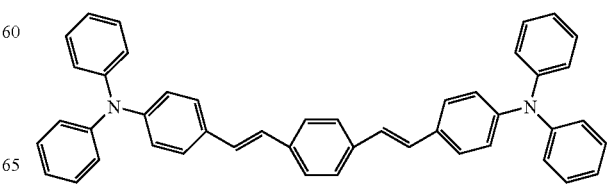

13. An organic light-emitting device, comprising:
a cathode;
an anode; and
a layer structure disposed between the cathode and anode, the layer structure comprising:
a hole source adjacent to the anode; and
a layer sub-structure disposed between the hole source and the cathode, the layer sub-structure comprising a first further layer and a second further layer, the first further layer comprising an electron source adjacent to the cathode; and the second further layer comprising a light emitting layer disposed between the electron source and the hole source, wherein at least one of the two further layers contains at least one of anthracene derivatives, the anthracene derivatives having a structure:

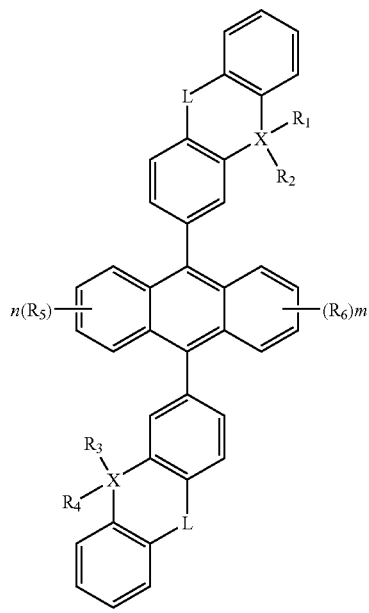

wherein $R_1$, $R_2$, $R_3$, $R_4$ are each individually selected from the group consisting of alkyl ($C_{1-12}$) and aryl ($C_{6-20}$);

$R_5$, $R_6$ are each selected from the group consisting of methyl and F;

X is selected from the group consisting of C and Si;

L is a number of bonds, selected from 0 and 1; and n, m are positive integers ranged from 0 to 4, wherein the light emitting layer is substantially made of ADN doped with DSA; and the electron source is substantially made of said at least one of anthracene derivatives doped with CsF.

14. An organic light-emitting device, comprising:
a cathode;
an anode; and
a layer structure disposed between the cathode and anode, the layer structure comprising:
a hole source adjacent to the anode;
an electron source adjacent to the cathode; and
a light emitting layer disposed between the electron source and the hole source, wherein the light emitting layer contains at least one of anthracene derivatives, the anthracene derivatives having a structure:

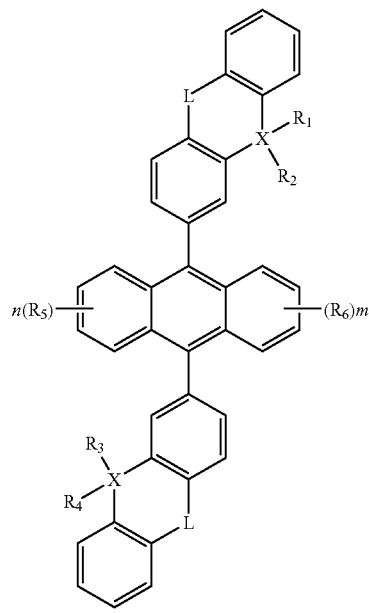

wherein $R_1$, $R_2$, $R_3$, $R_4$ are each individually selected from the group consisting of alkyl ($C_{1-12}$) and aryl ($C_{6-20}$);

$R_5$, $R_6$ are each selected from the group consisting of methyl and F;

X=Si;

L is a number of bonds, equal to 1; and n, m are positive integers ranged from 0 to 4.

15. The organic light-emitting device of claim 14, wherein said one of anthracene derivatives in the light-emitting layer is used a dopant in an organic host material.

16. The organic light-emitting device of claim 14, wherein said one of anthracene derivatives in the light-emitting layer is used as a host material doped with a luminescent dopant.

17. The organic light-emitting device of claim 14, wherein the electron source comprises an electron injection layer made substantially of LiF.

18. An organic light-emitting device, comprising:
a cathode;
an anode; and
a layer structure disposed between the cathode and anode, the layer structure comprising:
a hole source adjacent to the anode;
an electron source adjacent to the cathode; and
a light-emitting layer disposed between the electron source and the hole source, wherein the electron source contains at least one of anthracene derivatives, the anthracene derivatives having a structure:

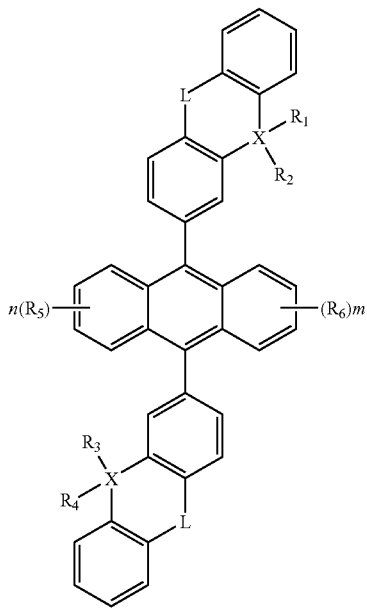

wherein
R₁, R₂, R₃, R₄ are each individually selected from the group consisting of alkyl ($C_{1-12}$) and aryl ($C_{6-20}$);
R₅, R₆ are each selected from the group consisting of methyl and F;
X=Si;
L is a number of bonds, equal to 1; and
n, m are positive integers ranged from 0 to 4.

19. An organic light-emitting device, comprising:
a cathode;
an anode; and
a layer structure disposed between the cathode and anode, the layer structure comprising:
a hole source adjacent to the anode;
an electron source adjacent to the cathode; and
a light-emitting layer disposed between the electron source and the hole source, wherein the electron source contains at least one of anthracene derivatives, the anthracene derivatives having a structure:

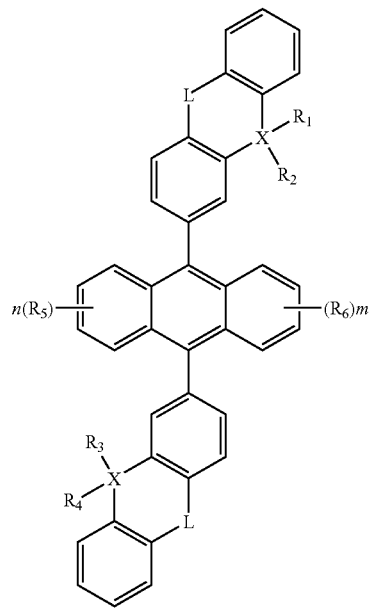

wherein
R₁, R₂, R₃, R₄ are each individually selected from the group consisting of alkyl ($C_{1-12}$) and aryl ($C_{6-20}$);
R₅, R₆ are each selected from the group consisting of methyl and F;
X is selected from the group consisting of C and Si;
L is a number of bonds, selected from 0 and 1; and
n, m are positive integers ranged from 0 to 4,
wherein the electron source comprises an electron transport layer, and said one of anthracene derivatives is used in the electron transport layer as a host material doped with a luminescent dopant.

20. The organic light-emitting device of claim 18, wherein the electron source comprises an electron injection layer made substantially of LiF.

* * * * *

UNITED STATES PATENT AND TRADEMARK OFFICE
CERTIFICATE OF CORRECTION

PATENT NO.       : 7,479,330 B2                                  Page 1 of 1
APPLICATION NO.  : 11/138707
DATED            : January 20, 2009
INVENTOR(S)      : Yu et al.

It is certified that error appears in the above-identified patent and that said Letters Patent is hereby corrected as shown below:

In column 23, line 46, claim 13, line 46, "alkvl" should be --alkyl--.

Signed and Sealed this

Seventeenth Day of March, 2009

JOHN DOLL
*Acting Director of the United States Patent and Trademark Office*